(12) United States Patent
Winkler et al.

(10) Patent No.: US 8,256,920 B2
(45) Date of Patent: Sep. 4, 2012

(54) ILLUMINATION UNIT CONSISTING OF DISCHARGE LAMP, LEDS AND CONVERSION PHOSPHORS

(75) Inventors: Holger Winkler, Darmstadt (DE); Thomas Juestel, Witten (DE)

(73) Assignee: Merck Patent Gesellschaft Mit Beschrankter Haftung, Darmstadt (DE)

( * ) Notice: Subject to any disclaimer, the term of this patent is extended or adjusted under 35 U.S.C. 154(b) by 263 days.

(21) Appl. No.: 12/599,889

(22) PCT Filed: Apr. 18, 2008

(86) PCT No.: PCT/EP2008/003144
§ 371 (c)(1),
(2), (4) Date: Nov. 12, 2009

(87) PCT Pub. No.: WO2008/138449
PCT Pub. Date: Nov. 20, 2008

(65) Prior Publication Data
US 2010/0309647 A1 Dec. 9, 2010

(30) Foreign Application Priority Data
May 14, 2007 (DE) .......................... 10 2007 022 566

(51) Int. Cl.
*F21V 9/16* (2006.01)
*F21S 19/00* (2006.01)
(52) U.S. Cl. ......................................... 362/229; 362/84
(58) Field of Classification Search .................... 362/84, 362/228, 229, 230, 231
See application file for complete search history.

(56) References Cited

U.S. PATENT DOCUMENTS

| 6,068,383 | A  | * | 5/2000 | Robertson et al. | 362/84 |
|---|---|---|---|---|---|
| 6,149,283 | A  | * | 11/2000 | Conway et al. | 362/236 |
| 6,234,648 | B1 | * | 5/2001 | Borner et al. | 362/235 |
| 6,357,889 | B1 | * | 3/2002 | Duggal et al. | 362/84 |
| 6,840,646 | B2 | * | 1/2005 | Cornelissen et al. | 362/606 |
| 7,144,131 | B2 | * | 12/2006 | Rains | 362/231 |
| 7,791,092 | B2 | * | 9/2010 | Tarsa et al. | 257/98 |
| 2005/0265023 | A1 | * | 12/2005 | Scholl | 362/229 |
| 2006/0023447 | A1 | * | 2/2006 | Justel et al. | 362/231 |
| 2008/0259596 | A1 | * | 10/2008 | Biebl et al. | 362/228 |

FOREIGN PATENT DOCUMENTS

| AT | 8159 U1 | 2/2006 |
|---|---|---|
| CN | 1289454 A | 7/2005 |
| EP | 1557604 B1 | 7/2005 |
| EP | 1557604 W | 7/2005 |
| JP | 08180840 A | 7/1996 |

(Continued)

OTHER PUBLICATIONS

Japan Outdoor Lighting MFG Co. Ltd., "Street Light", Patent Abstracts of Japan—Publication No. 2004-087349 dated Mar. 18, 2004.

*Primary Examiner* — David Crowe
(74) *Attorney, Agent, or Firm* — Millen, White, Zelano & Branigan, P.C.

(57) ABSTRACT

The invention relates to an illumination unit having an adjustable color location consisting of a discharge lamp as primary light source and LEDs as secondary light source and additionally a phosphor layer in the form of a phosphor screen comprising conversion phosphors. Furthermore, the present invention relates to a method for lighting usable areas by the illumination unit according to the invention.

12 Claims, 6 Drawing Sheets

FOREIGN PATENT DOCUMENTS

| | | |
|---|---|---|
| JP | 08180840 W | 7/1996 |
| JP | 2004/087349 A | 3/2004 |
| WO | 2004036618 A1 | 4/2004 |
| WO | 2005012785 W | 2/2005 |
| WO | 2006137015 A1 | 12/2006 |
| WO | PCTEP0803144 R | 9/2008 |

* cited by examiner

Fig. 6 ously taken to mean a change in the control parameters of
ILLUMINATION UNIT CONSISTING OF DISCHARGE LAMP, LEDS AND CONVERSION PHOSPHORS The invention relates to an illumination unit having an adjustable colour location consisting of a discharge lamp as primary light source and LEDs as secondary light source and additionally a phosphor layer in the form of a phosphor screen comprising conversion phosphors. Furthermore, the present invention relates to a method for lighting usable areas by the illumination unit according to the invention.

High-pressure and low-pressure sodium vapour discharge lamps are extremely energy-efficient. The most important area of application of these lamps is street lighting, since here both the high energy efficiency (luminous efficiency in lm/W) and also the very long lifetime of greater than 30,000 hours come into play. These lamps can be recognised from the yellow-orange light which they emit and which is associated with poor colour reproduction (the absence of blue and yellow-green components in the spectrum results in it being impossible to see colours). The poor colour reproduction also represents a disadvantage for the street lighting segment, since traffic signs, for example, are consequently not visible in the correct colours at night. In addition, Na vapour lamps cannot be employed in segments such as, for example, greenhouse lighting without additional fluorescent lamps and, owing to the poor colour reproduction, are unsuitable for architectural and general lighting. The reason for the high energy efficiency and the poor colour reproduction lies in the discharge spectra, which result in the emission of yellow-orange light. In this wavelength region, the human eye has very good sensitivity (reason for the high luminous efficiency in lm/W), but it is necessary to employ multichromatic illumination sources for good colour reproduction ("colour vision"). The low-pressure sodium vapour lamp has only one peak in the visible region, at 589 nm (yellow-orange), in the emission spectrum.

The high-pressure sodium vapour lamp likewise has one emission maximum at 589 nm, where the peak half-value width is greater than in the low-pressure version. Here too, however, no components of adequate intensity, for example, in the blue or blue-green spectral region are present.

DE 200 07 134 U1 discloses an illumination device in which, besides a primary light source, secondary light sources which emit in a single colour are additionally provided. In this illumination device, the intensity of the secondary light sources can be adjusted steplessly in order to modify the colour location and in particular also the colour temperature or light colour.

EP 1 557 604 furthermore discloses an illumination device having at least one illuminant for lighting usable areas, where, in order to change the light spectrum shone onto the usable area by the illuminant, further light sources (LEDs) which emit in a single colour are provided in addition to the illuminant.

The object of the present invention is therefore to develop an illumination unit which eliminates the disadvantage of poor colour reproduction of sodium vapour lamps, where the high energy efficiency is retained and in which the colour location and in particular also the colour temperature can be controlled individually in a simple manner.

This object is achieved, surprisingly, by the provision of an illumination unit consisting of a discharge lamp, LEDs and additionally a phosphor layer comprising conversion phosphors. This illumination unit enables matching of the emission spectrum and adjustment of the colour temperature to the respective application by dimming the LEDs. Dimming is generally taken to mean a change in the control parameters of the LED. This can consist, for example, of operating the LED continuously with variable current strengths or operating it with current pulses with variable currentless time gaps between the current pulses. These lights consequently have a broad range of applications as highly energy-efficient lamps which have high colour reproduction. The use extends from improved traffic lighting via architectural lighting to general lighting. Suitable spectra with, in particular, blue and red components, which have a favourable effect on plant growth, can also be achieved for greenhouse lighting.

The present invention thus relates to an illumination unit having an adjustable colour location, having a housing (2), in which at least one primary light source and secondary light source is arranged, where the colour location of the two light sources is different and where the primary light source (6) emits orange-yellow light of a given colour location having a given colour temperature and light colour, while the secondary light source (10) emits light of a different colour location, in particular having a different light colour or coloured light, and where the intensity of the secondary light source (10) can be adjusted steplessly, and where the primary and secondary light source interact so that the colour location, in particular also the colour temperature and the light colour, of the radiation emitted by the illumination unit can differ from the primary light source, characterised in that the deflection means (4) located in the housing comprise a phosphor layer (12), comprising one or more conversion phosphors, and in that this phosphor layer can be excited by the secondary light source (10) to the emission of radiation whose colour location differs from the colour locations of the primary and secondary light sources.

The colour point region (colour space) corresponds to the totality of the points (x,y) located within the area of the CIE diagram, where this area is limited by the colour points of the Na vapour lamp, the blue LED and the phosphor or phosphor mixtures. The colour location is the point in a colour space which precisely defines the position of the colour of a measurement object (coloured light source). According to Grassmann's law, every colour space is three-dimensional, and consequently the colour location in the colour space defined in each case is defined by three coordinates.

Figure 1:
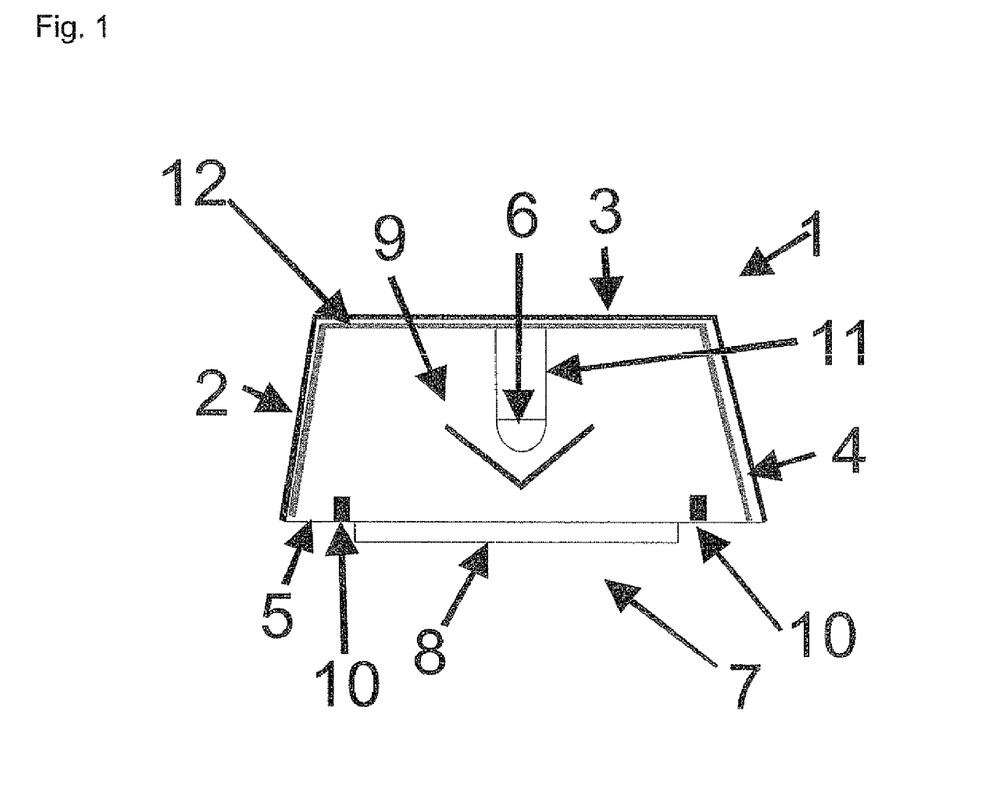
FIG. 1: sectional view of an illumination unit 1 according to the invention, consisting of a housing 2 having an upper wall 3, two side surfaces or deflection means 4 and a lower wall 5 and two side walls (not visible). The side walls are set at an angle against the upper wall 3. The lower wall 5 has a central light exit aperture 7, which is covered by a scattering means (diffuser plate) 8. A sodium vapour discharge lamp 6, whose light is protected against direct exit through the aperture 7 by a reflector 9 which has a V shape in cross section, is accommodated on a holder 11 in the interior of the housing 2. The yellow light from the sodium vapour discharge lamp serving as primary light source is deflected to the aperture 7 via the walls of the housing. In addition, four dimmable LEDs 10 (having different emission maxima of wavelength 445, 460, 468 and 482 nm) are arranged on each of the two sides of the sodium vapour discharge lamp 6 on the lower wall 5.
Figure 2:
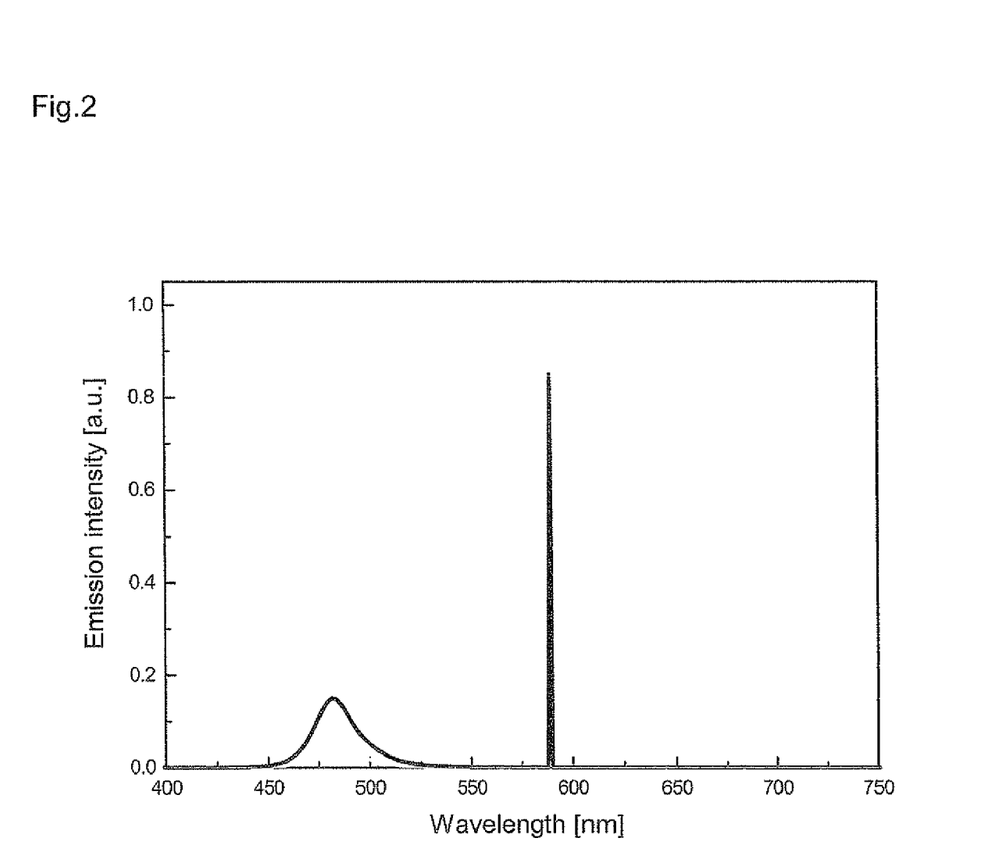
FIG. 2: spectrum of the illumination unit 1 according to the invention on use of an Na low-pressure discharge lamp with 480 nm LEDs
Figure 3:
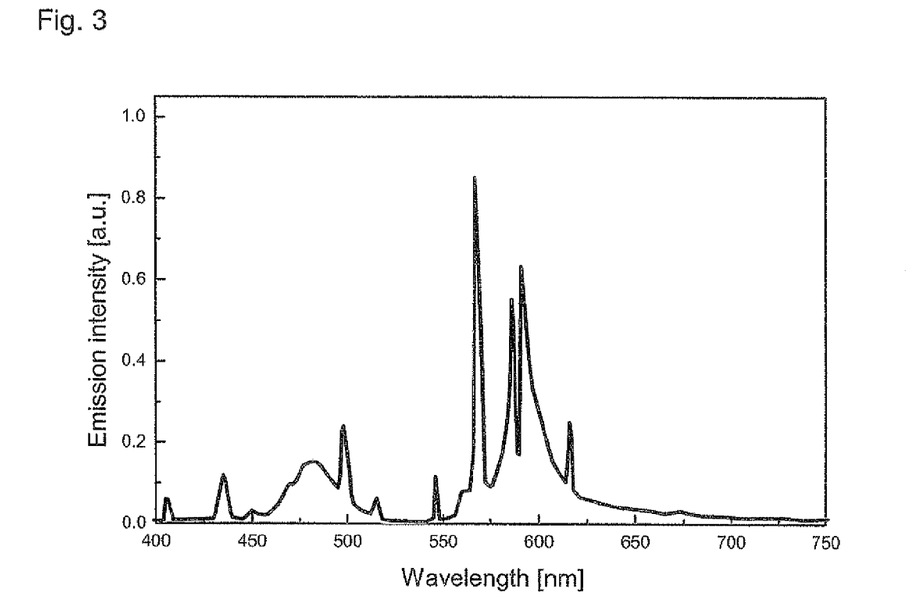
FIG. 3: spectrum of the illumination unit 1 according to the invention on use of an Na high-pressure discharge lamp with 480 nm LEDs

The illumination unit according to the invention consists of a conventional housing for discharge lamps. LEDs are additionally located in the housing (see FIG. 1). The blue light from the LEDs and the light from the discharge lamp is mixed here in the ray path and directed by the reflector (deflection means) onto the object to be illuminated. The spectrum, i.e. the colour temperature and the colour point of these lights, can be adapted for the particular application by dimming the LEDs. An additional blue component is thereby added to the emission spectrum, increasing the colour reproduction. The deflection means or reflector is additionally coated on the inside with conversion phosphors, which can be excited by the blue light from the LEDs. However, these conversion phosphors can only have slight high-temperature extinction, or none at all, since temperatures at the deflection means may rise to 200-300° C.

In accordance with the invention, higher colour reproduction overall can be achieved by this illumination unit than in the case of illumination systems from the prior art, since additional bands are emitted by the conversion phosphor(s) in the deflection means. A so-called multiband lamp where n>2, where n=discharge lamp, LED, phosphor 1, phosphor 2 etc.), results. By dimming the LED, the spectrum of the lamps (colour point and colour temperature) can be matched to the application.

In particular for night lighting of, for example, transport routes, an advantageous higher colour temperature can be established with the illumination unit according to the invention than conventional sodium vapour lamps, since the human eye can see better at night with bluish light.

The primary light source consists of a discharge lamp, where a sodium vapour discharge lamp (6) is preferred. The term "sodium vapour discharge lamp" is taken to mean sodium vapour high-pressure, medium-pressure and low-pressure lamps, which obtain their yellow light from gas discharge in sodium vapour. Pressures of 100 μbar to 10 bar prevail in this lamp. In contrast to fluorescent tubes, sodium vapour lamps do not require a fluorescent phosphor. In these lamps, the gas discharge itself generates visible light and does not first have to be converted into the latter.

Figure 4:
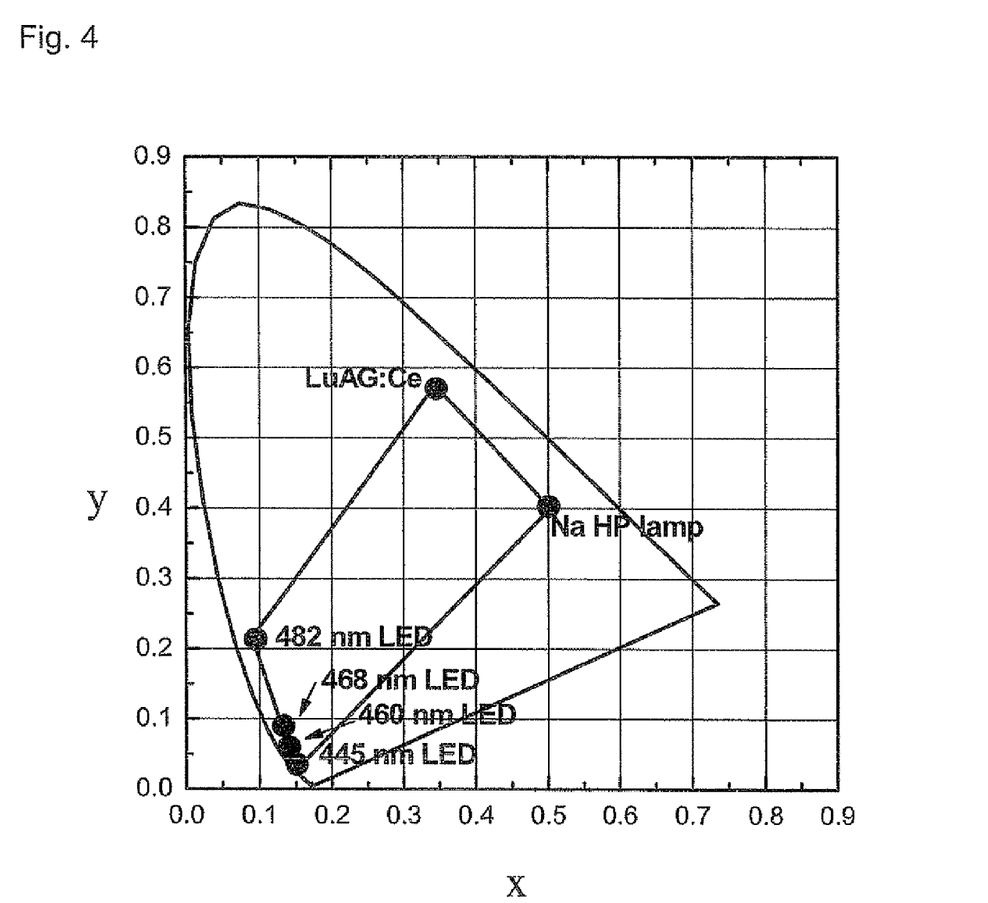
FIG. 4: shows the achievable colour space of the illumination unit 1 according to the invention, if a high-pressure sodium vapour lamp and four blue LEDs having emission maxima at 445 nm, 460 nm, 468 nm and 482 nm and a conversion phosphor layer consisting of LuAG:Ce [(Lu,Y)$_3$Al$_5$O$_{12}$:Ce] on the deflection means 4 are used.
Figure 5:
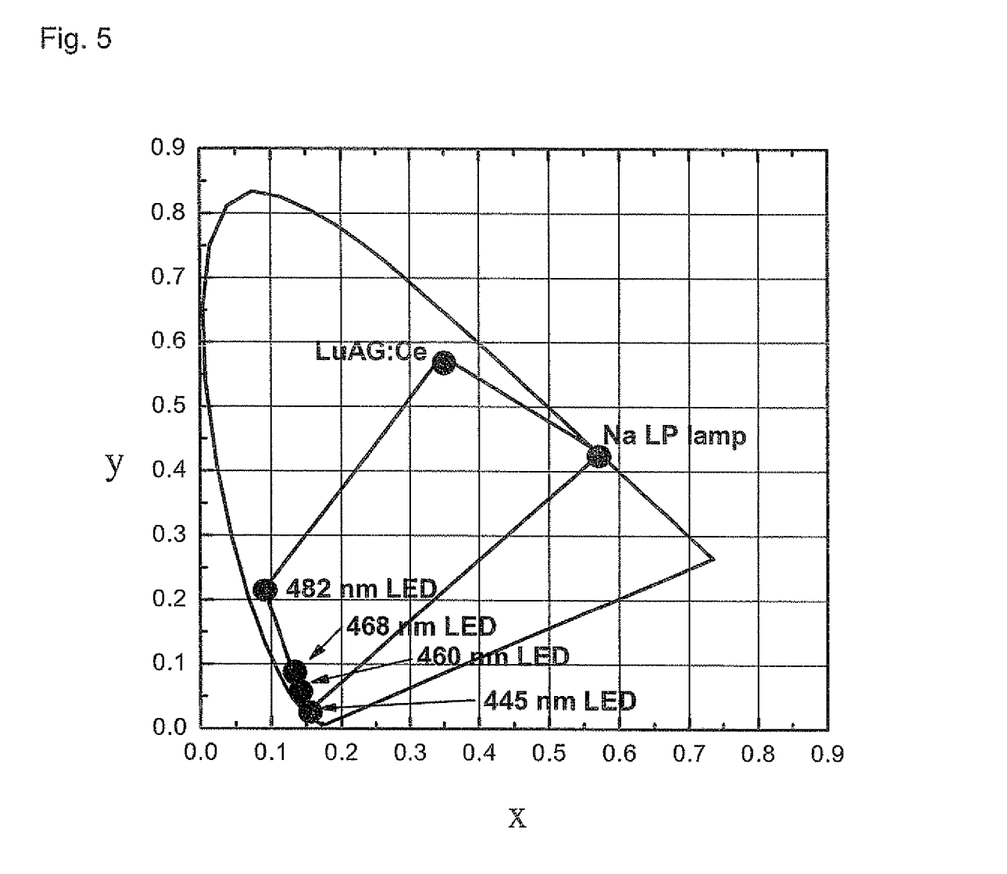
FIG. 5: shows the achievable colour space of the illumination unit 1 according to the invention, if a low-pressure sodium vapour lamp and four blue LEDs with emission maxima at 445 nm, 460 nm, 468 nm and 482 nm and a conversion phosphor layer consisting of LuAG:Ce [(Lu,Y)$_3$Al$_5$O$_{12}$:Ce] on the deflection means 4 are used.
Figure 6:
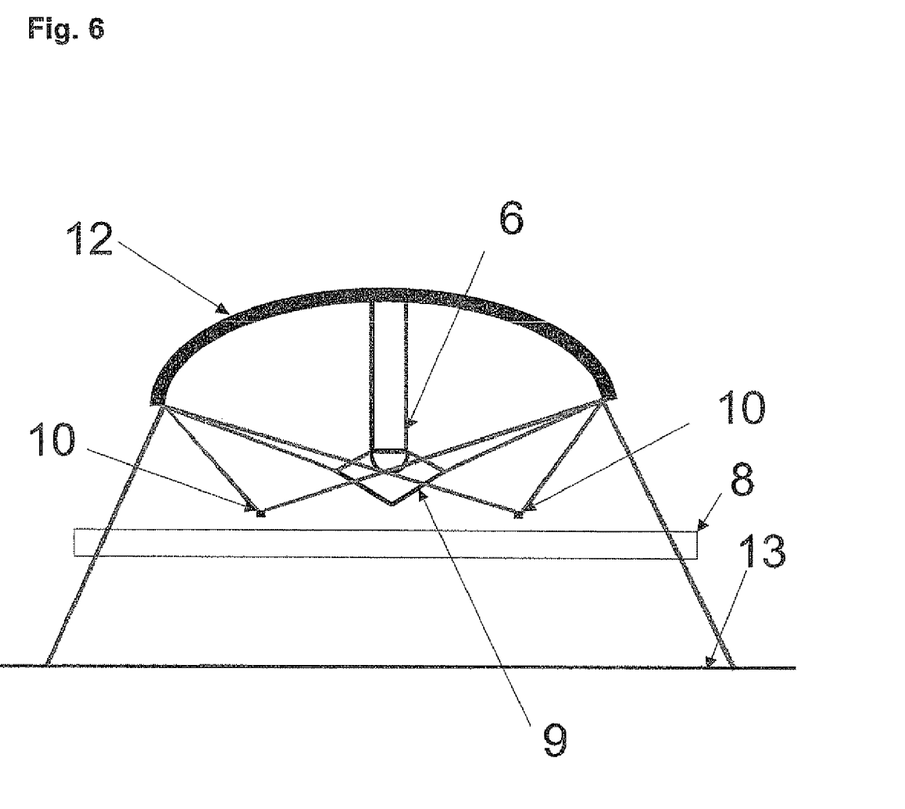
FIG. 6: shows the light distribution from the illumination unit according to the invention, where 6=primary light source, 8=scattering or diffuser plate, 9=reflector, 10=secondary light sources (LEDs), 12=phosphor layer, 13=usable area.

The secondary light source consists of at least one light-emitting diode (LED) 10 which emits UV or blue light having wavelengths of between 250 to 500 nm. The blue LEDs employed are high-power (energy consumption at least 1 watt) InGaN LEDs having emission maxima which have a wavelength of between about 440 and 480 nm, depending on the type of the LED. It is particularly preferred for different types of blue LED to be present in a lamp: in each case at least four blue dimmable LEDs having emission maxima of wavelength 445, 460, 468 and 482 nm in each case. All colour points which are located within the area defined by the black points (=colour point of the respective component) (see FIGS. 4 and 5) can then be established with the aid of the illumination unit according to the invention.

The LEDs 10 are arranged symmetrically to the right and left of the primary light source or discharge lamp 6 in such a way that the admixing of the radiation emitted by the LEDs 10 or of the radiation emitted by the phosphor layer 12 with the radiation from the discharge lamp 6 takes place beneath the illumination unit 1 in a region which is as close as possible to the secondary light sources 10.

The phosphor layer 12, which sits on the deflection means 4, is produced by converting the microcrystalline phosphor particles having a desired particle size distribution with an arithmetically averaged diameter of 0.6 μm to 70 μm, preferably between 1 μm to 25 μm and particularly preferably of 1.2 μm to 15 μm, into a suspension firstly by methods known to the person skilled in the art using substances known to the person skilled in the art. Examples thereof are described in the specialist literature, for example in Keith H. Butler, Fluorescent Lamp Phosphors, Pennsylvania State University Press, 1980, ISBN 0-271-00219-0.

This suspension can be formulated on an aqueous or organic basis. In the case of the aqueous formulation, the phosphor particles are suspended in a dispersion medium consisting of acrylate lattices, which may comprise surfactants, foam preventers and antiflocking additives. In the case of an organic formulation, the phosphor particles can be suspended, for example, in a medium based on ethylcellulose or nitrocellulose as binder. Possible compositions are, for example, 5 wt-% of nitrocellulose, 2.5 wt-% of ethanol, 87.5 wt-% of butyl acetate, 5 wt-% of diethyl phthalate in the case of the nitrocellulose base and 6.2 wt-% of ethylcellulose, 3.2 wt-% of dibutyl phthalate, 86.3 wt-% of xylene, 4.3 wt-% of butanol in the case of ethylcellulose.

These mixtures are applied to the deflection means with a phosphor particle concentration of up to 30 wt-%, for example via spray methods with the aid of a carrier gas, such as air (airbrush), dipping methods or with the aid of ink-jet valves and/or needle valves. This is followed by drying of the layer and subsequent heating to temperatures at which organic constituents are removed to a certain extent completely or partially by pyrolysis.

In a preferred embodiment, the phosphors may also be applied to the deflection means 4 dispersed in epoxy, silicone or acrylate resins, enabling the application likewise to be carried out by spraying with or without carrier gas, dipping, via inkjets or needle valves. After application, solidification of the mixture is necessary, which can be carried out by an elevated temperature or by exposing the coated deflection means 4 to radiation.

In a further embodiment, the phosphor layer may comprise additives, such as, for example, adhesion improvers for the adhesion of the phosphor layer to the deflection means 4, which can consist, for example, of microfine particles of $SiO_2$ or $Al_2O_3$. These additives may also contribute, through refractive-index adaptation, to optimisation of light coupling into or out of the phosphor layer or optimisation of the light path in the phosphor layer through scattering processes.

The phosphor layer 12 comprises one or more conversion phosphors which consist of the following phosphor materials: $(Y, Gd, Lu, Sc, Sm, Tb)_3 (Al, Ga)_5O_{12}$:Ce (with or without Pr), $(Ca, Sr, Ba)_2SiO_4$:Eu, $YSiO_2N$:Ce, $Y_2Si_3O_3N_4$:Ce, $Gd_2Si_3O_3N_4$:Ce, $(Y,Gd,Tb,Lu)_3Al_{5-x}Si_xO_{12-x}N_x$:Ce, $BaMgAl_{10}O_{17}$:Eu (with or without Mn), $SrAl_2O_4$:Eu, $Sr_4Al_{14}O_{25}$:Eu, $(Ca,Sr,Ba)Si_2N_2O_2$:Eu, $SrSiAl_2O_3N_2$:Eu, $(Ca,Sr,Ba)_2Si_5N_8$:Eu, $CaAlSiN_3$:Eu, $(Ca,Sr,Ba)_2SiO_5$:Eu, $(Ca,Sr)AlSiN_3$:Eu, $LaEuSi_2N_3O_2$:Eu, $LaSi_3N_5$:Eu, $(Ca,Sr,Ba)Si_2N_2O_4$:Eu, $CaSiN_2$:Eu, molybdates, tungstates, vanadates, group III nitrides, oxides, in each case individually or mixtures thereof with one or more activator ions, such as Ce, Eu, Mn, Cr, Tb and/or Bi.

In a further embodiment, the light exit aperture 7 of the illumination unit may be provided with a scattering means 8, a diffuser or the like, which fully or only partly covers the aperture.

The two different light sources can advantageously be controlled using a single specific precontroller, in particular on use of a discharge lamp in combination with a plurality of LEDs.

The present invention furthermore relates to a method for lighting usable areas by the illumination unit 1 according to the invention, where the primary and secondary light source and the deflection means 4 with the illumination layer 12 are arranged in such a way that a multiband lamp having high colour reproduction and colour temperature and a high useful illumination efficiency results.

DESCRIPTION OF THE DRAWINGS

The invention will be explained in greater detail below with reference to an illustrative embodiment.

These LEDs 10 excite the phosphor layer 12, which comprises conversion phosphors, present in the deflection means 4.

The invention claimed is:

1. An illumination unit (1) having an adjustable colour location, having a housing (2), in which at least one primary light source and secondary light source are arranged, where the colour locations of the two light sources are different and where the primary light source is a sodium vapour discharge lamp, which emits orange-yellow light of a given colour location having a given colour temperature and light colour, while the secondary light source (10) is at least one LED which emits UV or blue light, and where the intensity of the secondary light source can be adjusted steplessly, and where the primary and secondary light sources interact so that the colour location of the radiation emitted by the illumination unit can differ from the primary light source, wherein a deflector (4) located in the housing comprises a phosphor layer (12), comprising one or more conversion phosphors, and which phosphor layer can be excited by the secondary light source to the emission of radiation whose colour location differs from the colour locations of the primary and secondary light sources.

2. An illumination unit according to claim 1, wherein the secondary light source emits UV light.

3. An illumination unit according to claim 1, wherein the secondary light source emits blue light.

4. An illumination unit according to claim 1, wherein the phosphor layer (12) comprises only homogeneous conversion phosphor particles or resin-dispersed homogeneous conversion phosphor particles.

5. An illumination unit according to claim 1, wherein the phosphor layer (12) comprises additives.

6. An illumination unit according to claim 1, wherein the phosphor layer (12) comprises one or more conversion phosphors which contain at least one of the following phosphor materials: (Y, Gd, Lu, Sc, Sm, Tb)$_3$ (Al, Ga)$_5$O$_{12}$:Ce (with or without Pr), (Ca, Sr, Ba)$_2$SiO$_4$:Eu, YSiO$_2$N:Ce, Y$_2$Si$_3$O$_3$N$_4$:Ce, Gd$_2$Si$_3$O$_3$N$_4$:Ce, (Y,Gd,Tb,Lu)$_3$Al$_{5-x}$Si$_x$O$_{12-x}$N$_x$:Ce, BaMgAl$_{10}$O$_{17}$:Eu (with or without Mn), SrAl$_2$O$_4$:Eu, Sr$_4$Al$_{14}$O$_{25}$:Eu, (Ca,Sr,Ba)Si$_2$N$_2$O$_2$:Eu, SrSiAl$_2$O$_3$N$_2$:Eu, (Ca,Sr,Ba)$_2$Si$_5$N$_8$:Eu, CaAlSiN$_3$:Eu, (Ca,Sr,Ba)$_2$SiO$_5$: Eu, (Ca,Sr)AlSiN$_3$:Eu, LaEuSi$_2$N$_3$O$_2$:Eu, LaSi$_3$N$_5$:Eu, (Ca,Sr,Ba)Si$_2$N$_2$O$_4$:Eu, CaSiN$_2$:Eu, molybdates, tungstates, vanadates, group III nitrides, oxides, in each case individually or mixtures thereof with one or more activator ions.

7. An illumination unit according to claim 6, wherein the one or more activator ions are Ce, Eu, Mn, Cr, Tb and/or Bi.

8. An illumination unit according to claim 1, wherein the directly emitted radiation from the light sources passes through a scatterer.

9. A method for lighting an area by an illumination unit (1) according to claim 1, comprising arranging the light sources and the deflector (4) such a way that a multiband lamp having high colour reproduction and colour temperature and a high illumination efficiency results.

10. An illumination unit (1) unit according to claim 1, wherein the colour temperature and the light colour of the radiation emitted by the illumination unit differs from the primary light source.

11. An illumination unit according to claim 1, wherein the phosphor layer (12) comprises one or more conversion phosphors which contain at least one of the following phosphor materials: (Y, Gd, Lu, Sc, Sm, Tb)$_3$ (Al, Ga)$_5$O$_{12}$:Ce (with or without Pr), (Ca, Sr, Ba)$_2$SiO$_4$:Eu, YSiO$_2$N:Ce, Y$_2$Si$_3$O$_3$N$_4$:Ce, Gd$_2$Si$_3$O$_3$N$_4$:Ce, (Y,Gd,Tb,Lu)$_3$Al$_{5-x}$Si$_x$O$_{12-x}$N$_x$:Ce, BaMgAl$_{10}$O$_{17}$:Eu (with or without Mn), SrAl$_2$O$_4$:Eu, Sr$_4$Al$_{14}$O$_{25}$:Eu, (Ca,Sr,Ba)Si$_2$N$_2$O$_2$:Eu, SrSiAl$_2$O$_3$N$_2$:Eu, (Ca,Sr,Ba)$_2$Si$_5$N$_8$:Eu, CaAlSiN$_3$:Eu, (Ca,Sr,Ba)$_2$SiO$_5$: Eu, (Ca,Sr)AlSiN$_3$:Eu, LaEuSi$_2$N$_3$O$_2$:Eu, LaSi$_3$N$_5$:Eu, (Ca,Sr,Ba)Si$_2$N$_2$O$_4$:Eu, CaSiN$_2$:Eu, molybdates, tungstates, vanadates, in each case individually or mixtures thereof with one or more activator ions which are Ce, Eu, Mn, Cr, Tb and/or Bi.

12. An illumination unit according to claim 1, wherein the directly emitted radiation from the light sources passes through a scattering or diffuser plate.

\* \* \* \* \*